United States Patent [19]

Reitmeier et al.

[11] Patent Number: 4,518,996
[45] Date of Patent: May 21, 1985

[54] SYNCHRONIZATION SYSTEM THAT USES ALL VALID SIGNALS

[75] Inventors: Glenn A. Reitmeier, Trenton; Charles R. Thompson, Moorestown, both of N.J.

[73] Assignee: RCA Corporation, Princeton, N.J.

[21] Appl. No.: 477,492

[22] Filed: Mar. 21, 1983

[51] Int. Cl.³ .............................................. H04N 5/04
[52] U.S. Cl. .................................. 358/148; 358/314; 358/319; 360/37.1; 360/38.1
[58] Field of Search ............... 358/148, 149, 314, 319, 358/336, 339; 375/106, 108, 118; 360/38.1, 37.1; 328/179

[56] References Cited

U.S. PATENT DOCUMENTS 4,297,728 10/1981 Lowe ................................. 358/148
4,313,129 1/1982 Fukui ................................. 358/314

Primary Examiner—Tommy P. Chin
Assistant Examiner—Michael D. Parker
Attorney, Agent, or Firm—Eugene M. Whitacre; Paul J. Rasmussen; Henry I. Steckler

[57] ABSTRACT

A synchronization system for serial digital television signals compares successive sync signals to form an error signal and also delays the digital signals. The information signal delay is changed during loss of signal by an amount in accordance with the error signal to resync the signal. Thus valid information occuring before loss of synchronization is utilized. The delay means can comprise a pair of RAMs.

10 Claims, 23 Drawing Figures

SYNCHRONIZATION SYSTEM THAT USES ALL VALID SIGNALS

BACKGROUND OF THE INVENTION

The present invention relates to a synchronization system, and more particularly to one for use with a DVTR (digital video tape recorder).

In a DVTR, parallel digital words representing picture samples are converted into serial form for recording on tape. When the serial data is replayed and reconverted into parallel data, it must be operated on in the correct sequence, so that the bits of reconstructed parallel data retain the proper sequence of bits, i.e., MSB (most significant bit) to LSB (least significant bit). This type of synchronization (sync) is known as "bit sync," since it is the synchronization required to identify the MSB of a sample. In a DVTR, bit sync may be lost due to the occurrence of a signal dropout due to the skipping of a track in a search mode. Bit sync can also be lost due to a dropout even when no track skipping occurs if the clock extractor does not have a sufficient "flywheel" effect. Further even with analog recording when in the search mode, line sync can be lost. This leads to a degraded picture upon display.

It is therefore desirable to provide a system that uses all possible valid information to make up the resulting reproduced signal to avoid degradation thereof.

SUMMARY OF THE INVENTION

Method and apparatus for recovering valid information from an information signal having periodic synchronization signals and subject to loss of signal, comprising comparing successive synchronization signals to produce an error signal representing the difference between expected and actual synchronization signals, delaying said information signal, and synchronizing said information signal following loss of signal with the information signal preceding loss of signal by changing said delay during the loss of signal in accordance with said error signal.

DETAILED DESCRIPTION

Tape 100 is displaced from supply to take-up reels (not shown) past playback head 102, preferably using a helical scan-type tape transport (not shown). If the scan angle is less than 360 degrees it is necessary to use a plurality of heads with appropriate head switching circuitry or time compression with multiple tracts, all as known in the art.

Figure 1:
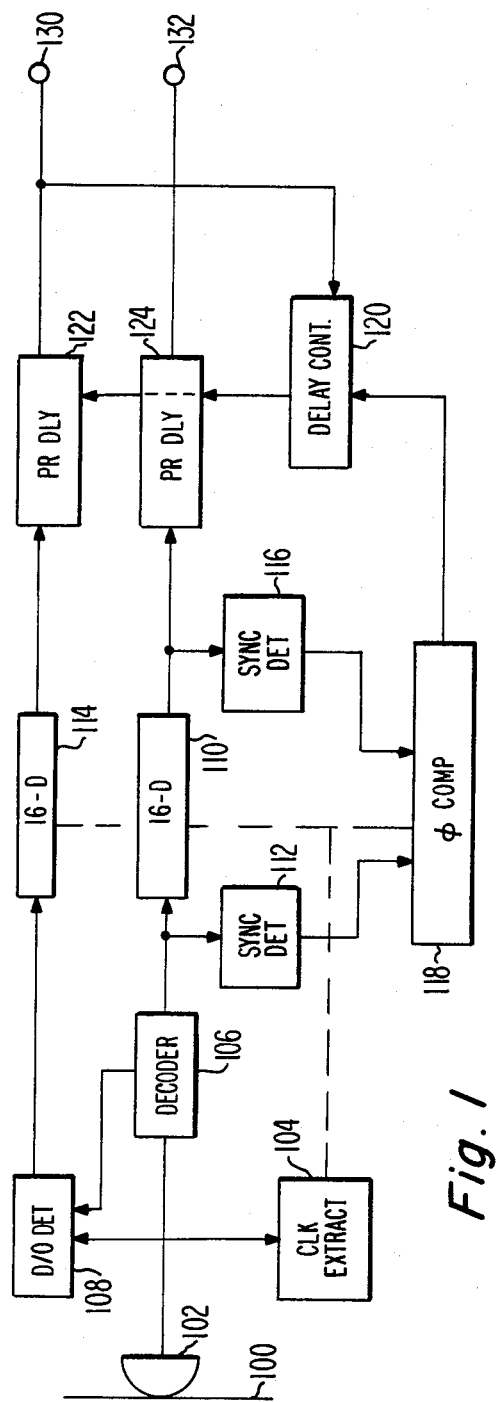
FIG. 1 is a system block diagram of the invention.

Tape 100 has recorded on it information, such as video signals in serial digital form, and using one of the familiar recording codes, such as enhanced NRZ or Miller squared, etc. For purposes of discussion it is assumed that for every 16 information bits there is a bit sync symbol or pattern although other arrangements are possible, e.g., using the line rate signal for bit sync. Each pixel is represented by four bits, so that the interval between two sync bits represents four pixels. The recorded signal is reproduced by head 102 and applies it to bit clock extractor 104, decoder 106, and to dropout detector 108. Extractor 104 provides the bit clock signal to all remaining system elements that need this information for proper operation. Decoder 106 converts the recording code into a conventional digital logic signal, such as ECL or TTL levels, and applies this signal to delay line 110, and bit sync detector 112, and also applies a signal indicating an invalid code word to dropout detector 108. Dropout detector 108 senses if the amplitude of the reproduced signal is too low and optionally receives the signal from decoder 106 indicating an invalid code word as shown in FIG. 1. Detector 108 provides an error flag to delay line 114, which flag at the output of detector 108 is delayed by the same amount as the output of decoder 106, assuming that the delays of detector 108 and decoder 106 are equal.

Delay lines 110 and 114 each have a delay of 16 minus D bits, and provide output signals to programmable delay lines 124 and 122, respectively. A bit sync detector 116 is placed on the output side of the delay line 110, and detects the occurrence of bit sync as does detector 112. The method of bit sync encoding and detection is irrelevant, but it may be, for example, the use of a Barker code, the use of a unique signal level, or the occurrence of a unique bit pattern. Phase comparator 118 measures the number of clock cycles between the detection of bit sync by sync detector 112 and sync detector 116, which is nominally D counts.

Phase comparator 118 provides a phase correction signal to delay control unit 120; the error flag after passing through programmable delay line 122 is also applied to unit 120. Delay controller 120 modifies the delay of programmable delay lines 124 and 122 in the signal and error flag paths respectively during the error period. In this manner, the number of bits per block is adjusted in order to regain bit sync after the dropout period as explained fully below. The length of the error flag is adjusted in accordance with the adjustment in the number of bits per block. The data output signal from delay line 124 is applied to output 132 and then to circuitry for further processing (not shown), such as (typically in the following order) a serial-to-parallel converter, tape format demultiplexer, time base corrector, and a dropout concealer that is actuated by a pixel-rate error flag signal derived from the bit-rate error flag signal from delay line 122 at output 130, all as known in the art.

Figure 2:
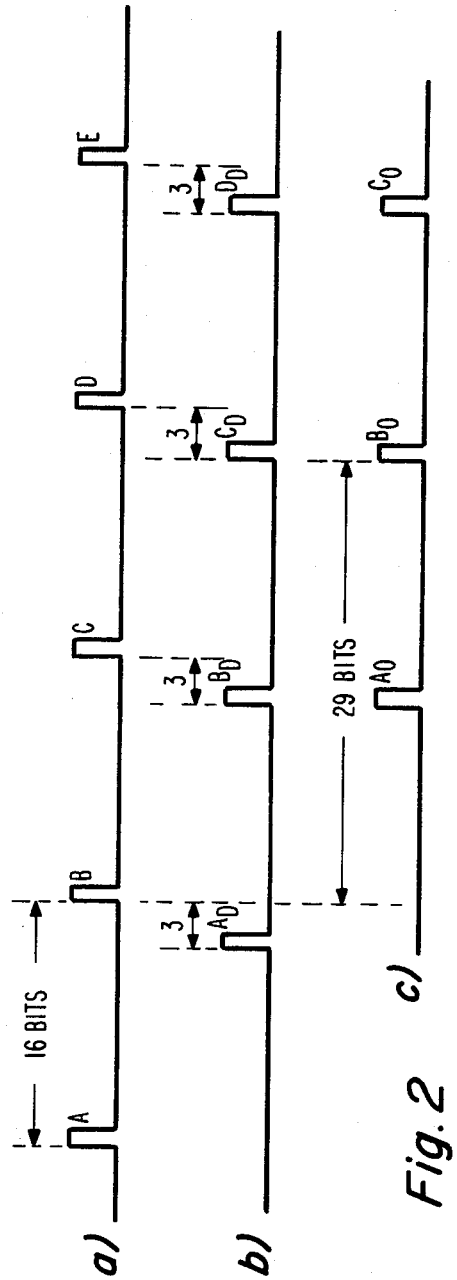
FIG. 2 is a timing diagram during nominal operation.

FIG. 2 illustrates the operation of the system during nominal (no dropout) periods. It is assumed that the number of bits per block=16 and D=3, and therefore the delay of each of delay lines 112 and 116 equals 13 bits. The time is expressed in terms of bits rather than in terms of absolute time because the information packing density on the tape is so great that minuscule variations in head-to-tape speed tape may significantly affect the absolute time duration required for the head to scan across 16 bits. This time variation is not of particular significance so long as the clock signal can be extracted from the data stream for proper timing of subsequent circuits. As mentioned, for purposes of explanation it is assumed that each sync pulse is associated with four pixels, each of which is represented by four bits, for a total of 16 bits occurring during 16 clock pulses. The bit clock does not run during extraction of the sync bit, so the timing diagrams cannot, strictly speaking, show the bit time during which the sync bit occurs. For ease of understanding, the sync bit is illustrated as occurring during the time of the first bit. FIG. 2(a) shows the block sync pulses that are detected by detector 112, labelled A, B and C, etc. FIG. 2(b) shows the delayed sync pulses detected by detector 116, labelled $A_D$, $B_D$, etc. It is noted that there are three bit periods between the sync signals $A_D$ and B, which are the signals compared by phase detector 118. Detector 118 provides an output signal to delay controller 120, which controller provides control signals to delay lines 122 and 124 so they have a delay of 16 bits (one block length). Thus, the sync signals at the output of delay line 124, shown in FIG. 2(c) and labelled $A_0$, $B_0$, etc., have a total delay with respect to the input sync signals of FIG. 2(a) of $16+13=29$ bits. A "0" output signal is provided by delay line 122 since no dropout occurred.

Figure 3:
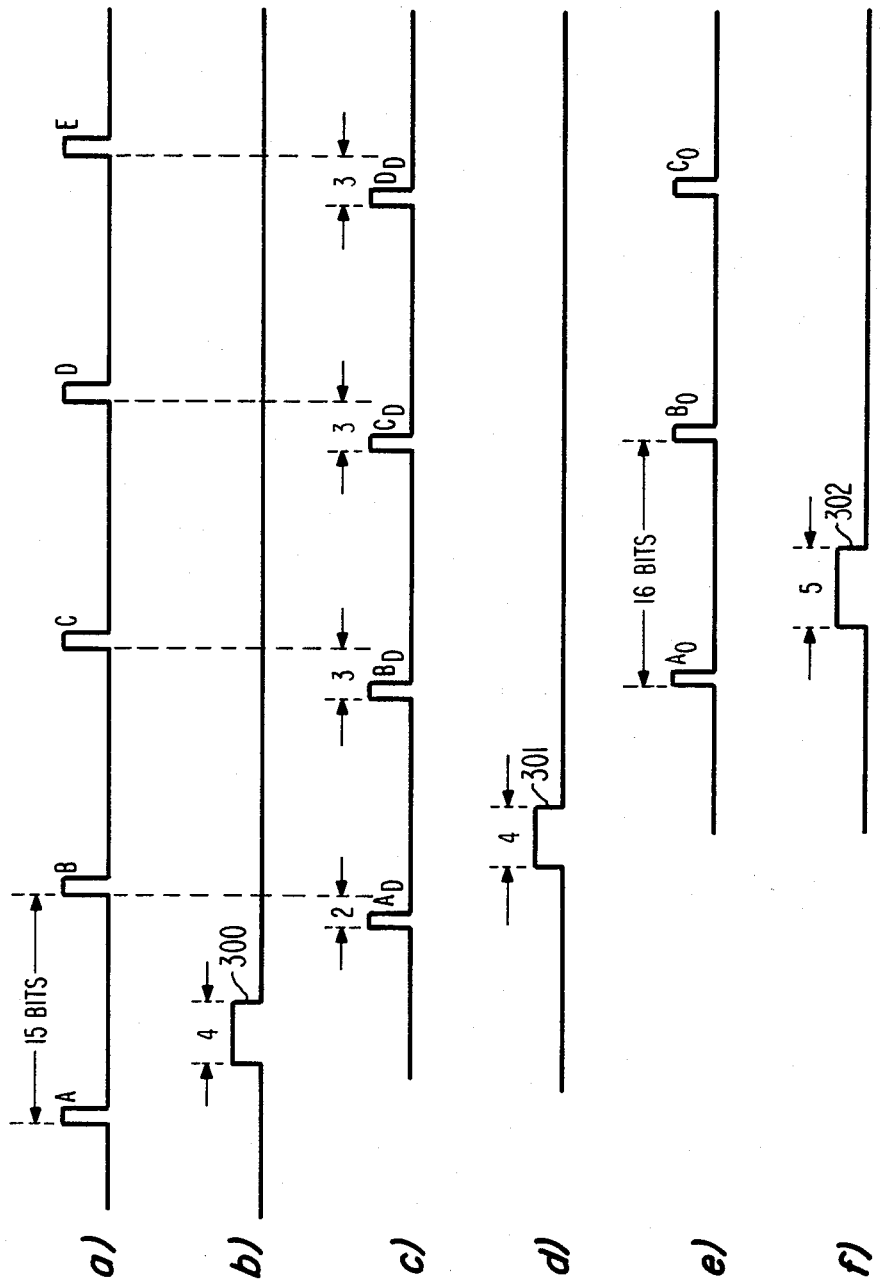
FIGS. 3, 4 and 5 are timing diagrams during synchronizing operations.

FIG. 3 illustrates the operation of the system when one type of dropout occurs. In FIG. 3(a) is shown the sync signal detected by detector 112, while FIG. 3(b) shows the dropout flag signal 300 generated by detector 108, which signal is 4 bits long. As a result of the head-to-tape time variations, the time between sync bits A and B corresponds to the time normally occupied by 15 bits, rather than 16 bits. The signal dropout marked by flag signal 300 does not affect the inter-sync-pulse time, but may perturb the clock signal extractor, whereby it appears that only 15 bits separate the pulses A and B in FIG. 3(a). FIG. 3(c) shows the delayed sync signal detected by detector 116. It is noted that pulse $A_D$ leads pulse B by only 2 bits instead of the nominal 3 bits. FIG. 3(d) shows the delayed dropout flag 301 at the output of delay line 114. Signals $A_D$ and B are compared by comparator 118, which provides a phase measurement signal to delay controller 120. Controller 120 during the dropout changes the delay of delay lines 122 and 124 from 16 to 17 bits, and thus the total delay during the inter-sync-pulse interval including the dropout period is 30 bits (instead of 29 bits) through delay lines 114 and 122, and delay lines 110 and 124. The result (as shown in FIG. 3(e) is that bit sync is regained as indicated in FIG. 3(e) by the spacing of pulses $A_0$ and $B_0$, which now is 16 bits, as compared to the original 15 bits of FIG. 3(a). FIG. 3(f) shows the error flag 302 at the output of delay line 122. It is now 5 bits wide as compared to 4 bits of flag 300 in FIG. 3(b). Therefore all valid data (groups of four bits representing one pixel) between sync pulses $A_0$ and $B_0$ can now be recovered, since the data following the dropout is in proper bit sync. Any pixel-representative grouping of four bits during which a dropout occurs is presumably erroneous, and therefore is declared invalid by the presence of a dropout flag. The presence of an invalid pixel is concealed by substituting for the four bits representing the invalid pixel a substitute four-word grouping from a concealer (not shown), that is actuated by a pixel-rate error flag derived from flag 302. In the example of FIG. 3, the 5-bit-long dropout flag occurs during two 4-bit pixels, and therefore only the first and the last four-bit pixels are valid. It should be noted that if the bit-timing were not corrected as described, the last valid pixel transmitted in the interval A-B could not be recovered correctly, and would be lost together with the second and third pixels.

Figure 4:
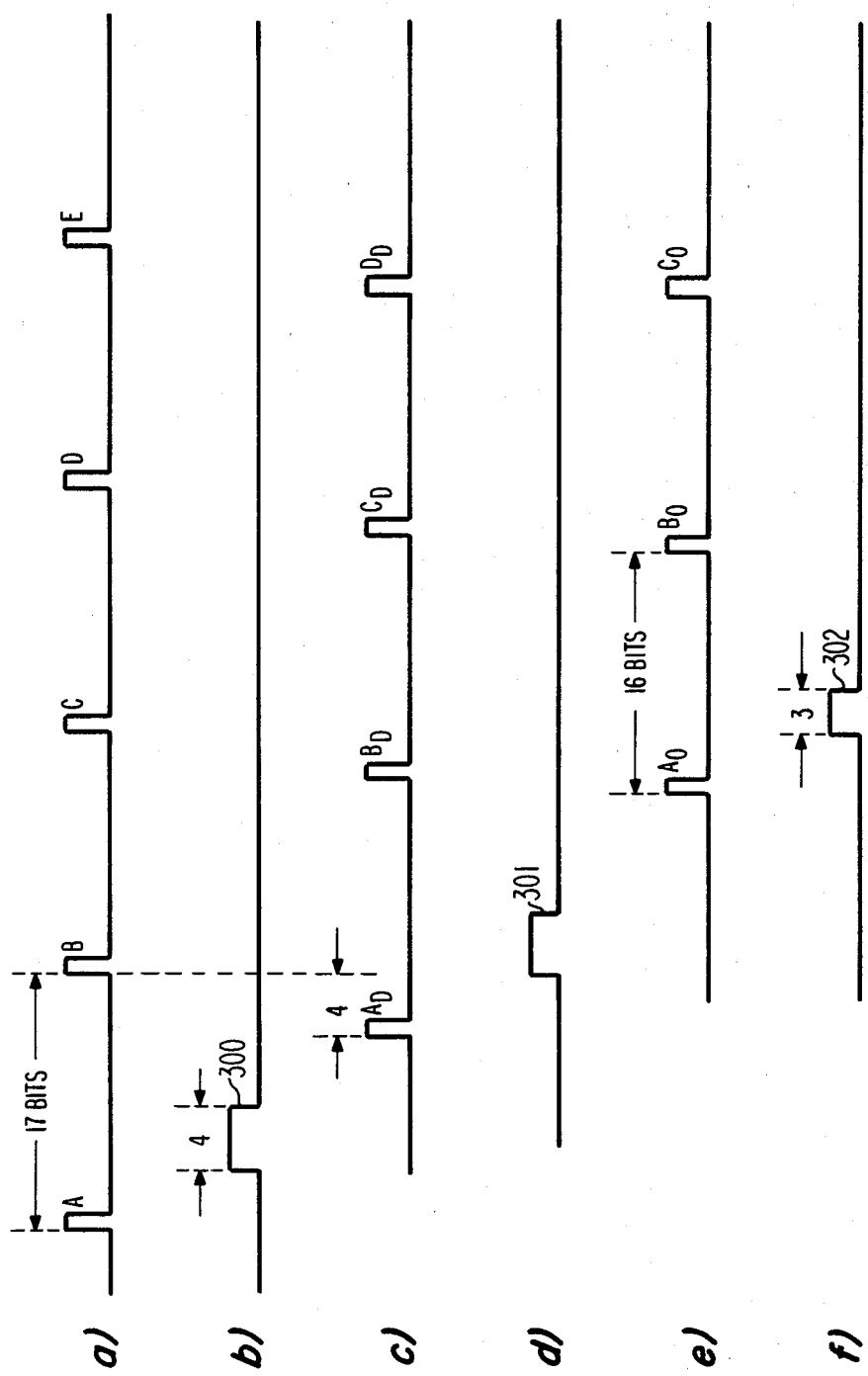

FIG. 4 illustrates the operation of the system when another type of dropout occurs. In FIG. 4(a) is shown the sync signal detected by detector 112, while FIG. 4(b) shows the dropout flag signal 300 generated by detector 108, which signal is 4 bits long. As a result of the dropout, this time 17 bits separate the pulses A and B in FIG. 4(a). FIG. 4(c) shows the delayed sync signal detected by detector 116. It is noted that pulse $A_D$ leads pulse B by 4 bits instead of the nominal 3 bits. FIG. 4(d) shows the delayed dropout flag 301 at the output of delay line 114. Signals $A_D$ and B are compared by comparator 118, which provides a phase measurement signal to delay controller 120. Controller 120 during the dropout changes the delay of delay lines 122 and 124 from 16 to 15 bits, and thus the total delay during the dropout period is 28 bits through delay lines 114 and 122, and delay lines 110 and 124. The result (as shown in FIG. 4(e)) is that bit sync is regained as indicated in FIG. 4(e) by the spacing of pulses $A_0$ and $B_0$, which now is 16 bits, as compared to the original 17 bits of FIG. 4(a). FIG. 4(f) shows the error flag 302 at the output of delay line 122. It is now 3 bits wide as compared to 4 bits of flag 300 in FIG. 4(b). Therefore all valid data between sync pulses $A_0$ and $B_0$ can now be recovered since the data following the dropout is in proper bit sync. In the example of FIG. 4, the first and last two pixels are valid while the second pixel is invalid as indicated by the presence of the dropout flag.

Figure 5:
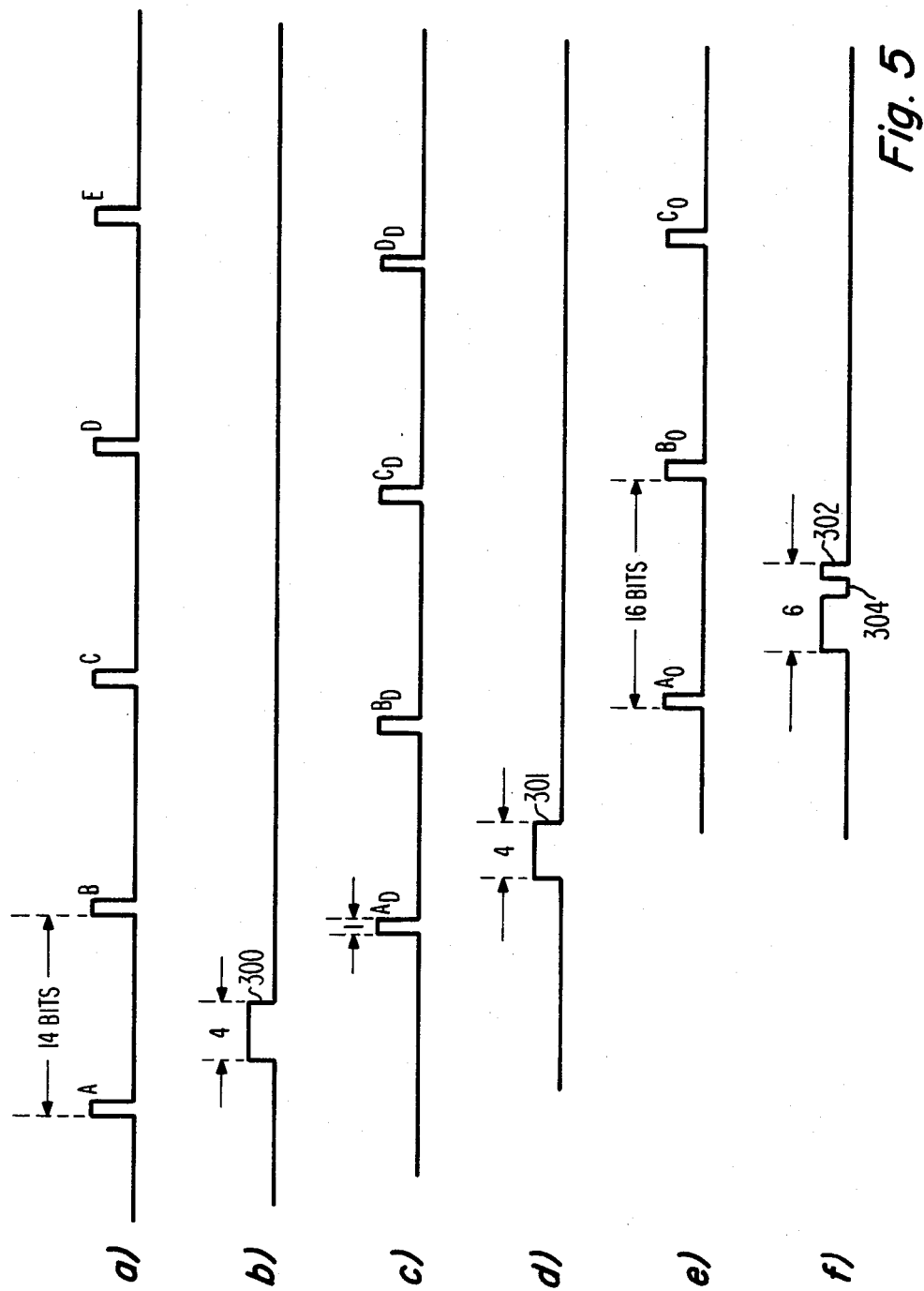

FIG. 5 illustrates the operation of the system when yet another type of dropout occurs. In FIG. 5(a) is shown the sync signal detected by detector 112, while FIG. 5(b) shows the dropout flag signal 300 generated by detector 108, which signal is still 4 bits long. As a result of this dropout, only 14 bits separate the pulses A and B in FIG. 5(a). FIG. 5(c) shows the delayed sync signal detected by detector 116. It is noted that in this case pulse $A_D$ leads pulse B by only 1 bit instead of the nominal 3 bits. FIG. 5(d) shows the delayed dropout flag 301 at the output of delay line 114. Signals $A_D$ and B are compared by comparator 118, which provides a phase measurement signal to delay controller 120. Controller 120 during the dropout again changes the delay of delay lines 122 and 124 from 16 to 18 bits, and thus the total delay during the dropout period is 31 bits (instead of 29 bits) through delay lines 114 and 122, and delay lines 110 and 124. The result (as shown in FIG. 5(e)) is that bit sync is regained as indicated by the spacing of pulses $A_0$ and $B_0$, which now is 16 bits, as compared to the original 14 bits of FIG. 5(a). FIG. 5(f) shows the error flag 302 at the output of delay line 122. It is now 6 bits wide as compared to 4 bits of flag 300 in FIG. 5(b). Therefore all valid data between sync pulses $A_0$ and $B_0$ can now be recovered. It is noted that error flag 302 has a low portion 304. This portion 304 occurs whenever the error flag must be lengthened by 2 or more bit periods since one must wait for the end of the dropout period to occur before jumping the address of a RAM delay line (described below) backwards so as to not jump too far backward into valid data and so that when valid data is regained after the jump it is in correct bit sync. This operation does not occur in the two previous cases, since when the lengthening by only one bit period or any degree of shortening the correction operation occurs at the beginning of the dropout period and the direction of correction is always further into the dropout period.

Figure 6:
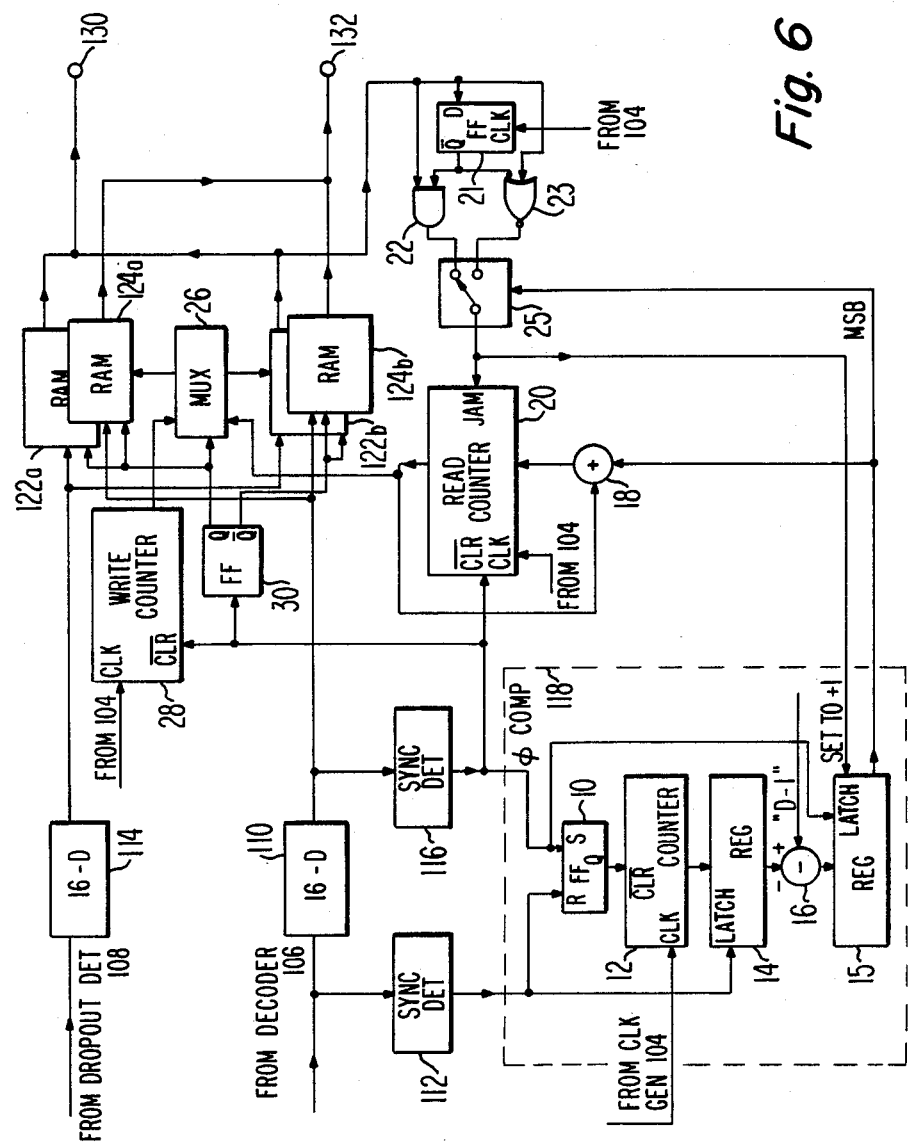
FIG. 6 shows details of a phase comparator, delay lines, and delay lines controller used in FIG. 1.

FIG. 6 shows in detail how phase detector 118, delay controller 120, and delay lines 122 and 124 can be implemented. In general, phase detector 118 is shown in dotted lines at the bottom left of FIG. 6, delay controller 120 is at the bottom right thereof, and delay lines 122 and 124 comprise RAMs 122a, 122b, 124a, and 124b at the top right thereof, which RAMs receive the signals from fixed delay lines 110 and 114.

SR (set-reset) FF (flip-flop) 10 is set by the detected output sync pulses of detector 116 and reset by the output sync pulses of detector 112. Thus its Q output is high during the time between the detection of the two sync pulses. The Q output of FF10 is fed to the $\overline{CLR}$ (clear on low) input of counter 12, allowing it to count clock pulses from extractor 104 applied to its clock input during the time between sync pulses. The count represents the phase difference between the detected sync pulses. The detection of sync by detector 112 latches the count of counter 12 into register 14, and also resets FF10, which in turn resets to zero counter 12. The count latched into register 14 passes through subtractor 16, which can comprise a ROM (read only memory) and which serves to transform the phase difference count into correction data by subtracting the nominal phase difference D from the measured phase difference $\phi$ plus one. (Since the jamming operation occurs on the next clock pulse following the jam enable, "plus one" is added so that the counter reaches a state on the jamming clock pulse which accounts for both the phase correction and the counter incrementing normally caused by the clock pulse). For the example given where the nominal phase difference, D=3, and the actual input phase difference is $\phi$, the output correction data from subtractor 16 is $\phi+1-D$ as follows:

| $\phi$ Diff. | Correction |
| --- | --- |
| 0 | −2 |
| 1 | −1 |
| 2 | 0 |
| 3 | +1 |
| 4 | +2 |
| 5 | +3 |
| 6 | +4 |
| 7 | +5 |

The output from subtractor 16 is latched into register 15 by the detection of sync by detector 116, thus providing a delay of 1 block time in the phase correction data. Hence the latching of the phase comparator data occurs at the beginning of the block during which the indicated phase correction will be implemented.

Delay line 122 comprises RAMS (random access memories) 122a and 122b, while delay line 124 comprises RAMS 124a and 124b. When no error exists, read counter 20 and write counter 28 count clock pulses from extractor 104 and are periodically reset by delayed sync pulses from detector 116. The pulses from detector 116 are also applied to divide-by-two frequency divider 30, comprising a toggle flip-flop with Q and $\overline{Q}$ outputs. The Q output from divider 30 controls MUX (multiplexer) 26, and also controls the read/write control input of RAMs 122a and 124a, while the $\overline{Q}$ output of divider 30 controls the read/write control input of RAMs 122b and 124b. MUX 26 receives output signals from counters 20 and 28 and alternately applies said output signals from counter 20 first to RAMS 122a and 124a and then to RAMs 122b and 124b, while applying said output signals from counter 28 first to RAMs 122b and 124b and then to RAMs 122a and 124a. Thus during a particular block of data, RAMs 122a and 124a write data, while RAMs 122b and 124b read data which was written during the previous block, thus resulting in a delay. During the next block, RAMs 122b and 124b write data, while RAMs 122a and 124a read data written during the previous block.

Thus, when there is no dropout, and RAM 124a is writing data signals from delay line 110, a "0" error flag signal being present from delay line 114 to be written into RAM 122a to indicate the presence of valid data, RAM 124b is reading data signals to output 132 and a "0" error flag signal is being read from RAM 122b to indicate the presence of valid data. Thereafter RAMs 122a and 124a read data signals to outputs 130 and 132 respectively, and RAMs 122b and 124b write data signals from delay lines 110 and 114. The cycle then repeats.

If however a dropout occurs, then an error flag signal is present at the output of delay line 114, and such signal is written into and read from RAMs 122a and 122b in synchronizism with the write and read operations of RAMs 124a and 124b, respectively. In addition the error flag from RAMs 122a and 122b is applied to the D input of flip-flop 21, to AND gate 22, and to NOR gate 23. The output of AND gate 22 is a one clock cycle wide pulse at the beginning of the error period, and the output of NOR gate 23 is a one clock cycle wide pulse immediately following the error period. The MSB from register 15 is a sign bit which controls switch 25 to select the output from AND gate 22 or NOR gate 23, to be applied to the jam control input of counter 20. If the sign bit is 0 (zero or positive number) AND gate 22 is selected, and if the sign bit is 1 (negative number) NOR gate 23 is selected. In this way, if the counter is to be jumped forward, the "corrected address" from adder 18, which comprises the present address in counter 20 plus the correction data as given in the above table, is jammed into counter 20 at the beginning of the error period thus changing the effective delay of whichever delay line RAMs are currently in the "read" state to correctly indicate all pixels having any erroneous bit as the result of a dropout, and thus preventing the introduction of any incorrect pixels in the output. Likewise, if the counter is to be jumped backwards, the "corrected address" from adder 18 is jammed into counter 20 at the end of the error period. The output from switch 25 also resets the contents of register 15 to +1, so that in the event of another dropout and the raising of the error flag, no further delay modification occurs. For example, in FIG. 3 a measured phase difference of two clock pulses results in a correction signal of 0, thus selecting AND gate 22 through switch 25. Thus in FIGS. 3e and 3f the read counter 20 cycles through addresses 0 thru 4, at which count AND gate 22 outputs a pulse which enables jamming of counter 20 at the next clock at which time the sum of the previous state plus the correction (in this example, 4 plus a correction of 0) is jammed into counter 20. Thus counter 20 addresses the appropriate RAM in the sequence 0, 1, 2, 3, 4, 4, 5, 6, 7, . . . thus lengthening the dropout period by one bit in order to regain bit sync after said dropout. The case of FIG. 4 works in much the same way. Since the correction is +2, AND gate 22 is again selected through switch 25 and outputs a pulse to enable jamming after counter 20 reaches a count of 4. This time the sum of the previous state plus the corrections is 6, so at the occurrence of the next clock pulse counter 20 is jammed to a state of 6. Thus the sequence of RAM addressing in FIGS. 4e and 4f is 0, 1, 2, 3, 4, 6, 7, 8 . . . , thus shortening the dropout period by one bit in order to regain bit sync after said dropout. Likewise, if the counter is to be jumped backwards, the "corrected address" from adder 18 is jammed into counter 20 at the end of the error period. The output from switch 25 also resets the contents of register 15 to +1, so that in the event of another dropout and the raising of the error flag, no further delay modification occurs. This is necessary so that subsequent delay modifications do not erroneously alter the bit timing.

In the case of FIG. 5, a measured phase difference of one clock pulse results in a correction signal of −1, thus selecting NOR gate 23 through switch 25. Thus in FIGS. 5e and 5f the read counter 20 cycles through addresses 0 through 8, at which count NOR gate 23 outputs a pulse to enable jamming of counter 20. Thus at the next clock pulse the sum of the previous counter state plus the correction (in this example 8 plus −1) is jammed into counter 20. Thus counter 20 addresses the appropriate RAM in the sequence 0, 1, 2, 3, 4, 5, 6, 7, 8, 7, 8, 9, 10 . . . thus lengthening the dropout period by two bits in order to regain bit sync after said dropout. Note that the output pulse from NOR gate 23 also resets the contents of register 15 to +1 which also selects AND gate 22 through switch 25. Although AND gate 22 produces a pulse after counter 20 reaches its second count of 7, at the next clock pulse counter 20 is jammed to the sum of the previous state plus the correction (i.e. 7 plus 1), so that counter 20 is simply incremented and counts in its normal manner. Likewise, no further delay modification can occur, since the contents of register 15 have been set to +1. In this manner, regardless of whether the error period needs to be increased or decreased to regain bit sync, the change always occurs during or immediately following the error period, thus causing the pixel rate error flag derived from the bit rate error flag to correctly indicate all pixels having any erroneous bit as the result of a dropout, and thus preventing the introduction of any incorrect pixels in the output.

So far it has been assumed that only one dropout occurs between sync signals. If a plurality of dropouts occur between sync signals, then the present invention will provide information signal recovery from the end of the last occuring dropout to the beginning of the second occurring sync signal in addition to the normally recoverable information signals from end of the first sync signal to the beginning of the first occurring droput. In such a case, it is desirable to activate the pixel rate error flag between the first and last dropouts, so that erroneous pixels caused by valid, but out of synchronization bits, are concealed.

It will be appreciated that many embodiments are possible within the spirit and scope of the invention. For example, delay lines 110 and 114 and sync detector 112 may be eliminated if phase comparator 118 comprises a counter of sufficient length to count through the entire block plus the maximum expected bit sync error. In this case, said counter provides the expected timing of the following sync signal as initialized by the preceeding sync signal. Further, S-R flip-flop 10 in FIG. 6 may be eliminated and counter 12 may now be reset by sync detected by detector 116. Likewise, register 14 is clocked by sync detector 116. Further, subtractor 16 now would subtract the value 15 from the contents of register 14 for application to register 15.

What is claimed is:

1. A method for recovering the valid information from an information signal having periodic synchronization signals and subject to loss of signal, said method comprising comparing successive synchronization signals to produce an error signal representing the timing difference between expected and actual synchronization signals, delaying said information signal, and synchronizing said information signal following loss of signal with the information signal preceding loss of signal by changing said delay during the loss of signal in accordance with said error signal.

2. Apparatus for recovering valid information from an information signal having periodic synchronization signals and subject to loss of signal, said apparatus comprising comparing means for comparing successive synchronization signals to produce an error signal representing the timing difference between expected and actual synchronization signals, delaying means for delaying said information signal, and changing means for changing said delay during the loss of signal in accordance with said error signal so that said information signal following loss of signal is synchronized with the information signal preceding loss of signal.

3. Apparatus as claimed in claim 2 wherein said information signal comprises a serial digital television signal.

4. Apparatus as claimed in claim 2, wherein said comparing means comprises a delay line having an input means for receiving said information signal and an output, a pair of synchronization signal detectors coupled to said input means and said output respectively, and a phase comparator coupled to said detectors.

5. Apparatus as claimed in claim 2, wherein said delaying means comprises a programmable delay line.

6. Apparatus as claimed in claim 5, wherein said delay line comprises a pair of RAMs, and means for alternating placing one RAM in the write mode and the remaining RAM in the read mode.

7. Apparatus as claimed in claim 2, wherein said changing means comprises a counter and means for jamming into said counter the present address of said counter plus said error signal during the loss of signal.

8. Apparatus as claimed in claim 2, further comprising generating means for generating an error flag, and delaying means for delaying said error flag in accordance with said error signal.

9. A method for recovering all valid digital signals from a digital data stream comprising clock information and blocks of digital words, in which each word is represented by a plurality of digital bits, each of said blocks of words being associated with block synchronizing information, said data stream being subject to time jitter and to dropouts during the interval between synchronizing information which may result in change of clock information during a block which in turn may result in incorrect assignment of bit rank to those digital words following said change of clock information and erroneous interpretation of said following digital words, the method comprising the steps of:

delaying said digital data stream by a fixed number of clock cycles to form a first delayed digital data stream;

extracting said synchronizing information from said digital data stream and from said first delayed digital data stream to form a first synchronizing signal and a first delayed synchronizing signal;

comparing the time of said first synchronizing signal and said first delayed synchronizing signal to form a control signal indicative of said change of clock information; and variably delaying said first delayed digital data stream by a variable number of clock cycles for forming a second delayed digital data stream under the control of said control signal for compensating for said change of clock information whereby said bit rank of said digital words following said change of clock information and erroneous interpretation of said following digital words is corrected.

10. A method according to claim 9 further comprising the steps of:
generating a dropout status indicative signal;
delaying said dropout status indicative signal by said fixed number of clock cycles to form a first delayed dropout status indicative signal;
delaying said first delayed dropout status indicative signal by said variable number of clock cycles under the control of said control signal for generating a second delayed dropout status indicative signal; and
controlling said variable delaying steps to occur during those times in which said second delayed dropout status indicative signal indicates that said second delayed digital data stream is subject to a dropout.

* * * * *